(12) United States Patent
Keller et al.

(10) Patent No.: US 11,320,514 B2
(45) Date of Patent: May 3, 2022

(54) METHOD AND DEVICE FOR MEASURING A DISTANCE TO A TARGET IN A MULTI-USER ENVIRONMENT BY MEANS OF AT LEAST ONE DETECTOR

(71) Applicant: FASTREE3D SA, Ecublens (CH)

(72) Inventors: Stefan Thomas Keller, Le Mont-sur-Lausanne (CH); Lucio Carrara, Lausanne (CH)

(73) Assignee: FASTREE3D SA, Ecublens (CH)

( * ) Notice: Subject to any disclaimer, the term of this patent is extended or adjusted under 35 U.S.C. 154(b) by 405 days.

(21) Appl. No.: 16/324,312

(22) PCT Filed: Aug. 12, 2016

(86) PCT No.: PCT/EP2016/069271
§ 371 (c)(1),
(2) Date: Feb. 8, 2019

(87) PCT Pub. No.: WO2018/028795
PCT Pub. Date: Feb. 15, 2018

(65) Prior Publication Data
US 2019/0170855 A1 Jun. 6, 2019

(51) Int. Cl.
*G01S 7/02* (2006.01)
*G01S 7/292* (2006.01)
(Continued)

(52) U.S. Cl.
CPC ............ *G01S 7/023* (2013.01); *G01S 7/0235* (2021.05); *G01S 7/2923* (2013.01);
(Continued)

(58) Field of Classification Search
CPC ...... G01S 13/222; G01S 15/105; G01S 17/10; G01S 7/023; G01S 7/2923; G01S 7/2926
See application file for complete search history.

(56) References Cited

U.S. PATENT DOCUMENTS 4,315,609 A * 2/1982 McLean ............... F41G 7/30
244/3.14
4,717,917 A 1/1988 Alitz
(Continued)

FOREIGN PATENT DOCUMENTS

EP ) 654 682 A2 5/1995

OTHER PUBLICATIONS

International Search Report and Written Opinion mailed May 11, 2017, issued in corresponding International Application No. PCT/EP2016/069271, filed Aug. 12, 2016, 8 pages.

*Primary Examiner* — Timothy X Pham
(74) *Attorney, Agent, or Firm* — Christensen O'Connor Johnson Kindness PLLC

(57) ABSTRACT

A method for measuring a distance to a target in a multi-user environment by means of at least one sensor, comprising: irradiating the environment by means of a series of radiation pulses, wherein series of radiation pulses are emitted at a determined repetition rate and with a determined random delay; collecting pulses that are reflected or scattered from the environment to at least a detector connected to at least one chronometer; assigning a timestamp at every detected pulse on the detector; subtracting the added delay from every registered timestamp coming from the chronometer, the result corresponding to the time of arrival; determining the statistical distribution of said time of arrival; determining the distance to the target from said statistical distribution.

10 Claims, 6 Drawing Sheets

(51) Int. Cl.
*G01S 17/10* (2020.01)
*G01S 15/10* (2006.01)
*G01S 13/22* (2006.01)

(52) U.S. Cl.
CPC .......... *G01S 7/2926* (2013.01); *G01S 13/222* (2013.01); *G01S 15/105* (2013.01); *G01S 17/10* (2013.01)

(56) References Cited

U.S. PATENT DOCUMENTS

| | | | |
|---|---|---|---|
| 7,683,825 B2* | 3/2010 | Sun | G01S 7/28 342/118 |
| 2008/0024355 A1* | 1/2008 | Sun | G01S 13/103 342/134 |
| 2010/0102203 A1* | 4/2010 | Grund | G01S 17/18 250/207 |
| 2010/0128246 A1 | 5/2010 | Heizmann et al. | |
| 2011/0316747 A1* | 12/2011 | Budianu | G01S 11/00 342/387 |
| 2016/0033644 A1* | 2/2016 | Moore | G01S 7/4865 356/5.01 |
| 2017/0016981 A1* | 1/2017 | Hinderling | G01S 17/26 |
| 2017/0188192 A1* | 6/2017 | Mujtaba | H04W 4/023 |
| 2018/0063811 A1* | 3/2018 | Richley | G01S 5/0221 |
| 2020/0150229 A1* | 5/2020 | Magnani | G01S 17/10 |

* cited by examiner

METHOD AND DEVICE FOR MEASURING A DISTANCE TO A TARGET IN A MULTI-USER ENVIRONMENT BY MEANS OF AT LEAST ONE DETECTOR

TECHNICAL FIELD

The present invention relates to a method and a device for detecting distances by the means of sending out a signal into the observed environment and recording the time-of-flight (TOF) needed for said signal to bounce off a target and echo back. This sent out signal is typically a wave of acoustic and/or electro-magnetic nature. The first type (wave of acoustic nature) is usually called sonar (standing for SOund Navigation And Ranging) and typically using ultra-sound. The latter (wave of electro-magnetic nature) is called either radar (RAdio Detection And Ranging) or lidar (Light Detection And Ranging, sometimes also known as ladar standing for laser radar) depending on what electro-magnetic frequency range is employed.

More specifically the present invention addresses the problem such time-of-flight systems encounter when multiple systems of similar construction are present in the same environment: these systems typically interfere with each other and end up corrupting the TOF detection of one another.

PRIOR ART

Time-of-flight (TOF) systems are well known, working with either acoustic waves (called sonar; SOund Navigation And Ranging), or electro-magnetic (em) waves emitting in the radio or microwave frequency range (called radar; RAdio Detection And Ranging; typically referring to em-radiation of frequencies <1 THz), or em waves emitting in the optical frequency range (called lidar; Light Detection And Ranging; typically referring to em-radiation of frequencies $\geq$ THz, those frequencies then usually referred to by its reciprocal representation called wavelength).

A time-of-flight (TOF) system emits a type of radiation onto a probed target and detects the reflected echo. By estimating the time this said radiation needed to return, and by assuming the propagation speed (c) of the considered radiation as constant and known, the distance to the target can be inferred. The radiation is typically of either acoustic or electro-magnetic (em) nature.

There are two distinct approaches to time-of-flight (TOF): they are called the direct and the indirect approach.

In direct time-of-flight (d-TOF) the system emits the radiation in form of a pulse, and measures directly the time starting from this emission until the echo returns. This time difference corresponds to the time-of-flight (TOF) that the emitted radiation needed to reach—what is usually called—the target, and to return. FIG. 1 illustrates this concept. In direct time-of-flight the distance (D) between TOF-system and target is computed as D=cTOF/2; with c being the propagation speed of the considered radiation in the considered medium.

A pulse of radiation can be identified as such based on for example the radiation amplitude exceeding a set threshold value in the time domain, or reciprocally, the radiation exceeding a certain value in the frequency domain. Detecting on exceeding a certain value is typically referred to as detecting the leading or rising edge; detecting on underrunning a value is typically referred to as detecting the trailing or falling edge. Apart from such threshold detections also other detection methods are possible, such as detecting a certain pulse shape—pulse again understood as realized in time or frequency domain, respectively. Examples of such pulses are given in U.S. Pat. No. 8,031,106 and US20120257186 for instance.

In indirect time-of-flight (i-TOF) the system emits a modulated radiation, and estimates the distance between system and target through the phase shift ($\phi$) between the modulated emission and detected echo. For example, the emission could be of the form sin($2\pi f$), and the detection of the form sin($2\pi f+\phi$). The distance is then estimated as $$D = \frac{c}{2}\frac{\phi}{2\pi f}.$$

This modulation can be realized with any arbitrary combination of radiation parameters, such as amplitude modulation, frequency modulation, and phase modulation.

Square wave modulation is often used as a crude approximation of the sine modulation as illustrated in FIG. 2. In a square wave modulation pulses are emitted, where the pulse indicates the high state (peak) of the equivalent sine and the off stage between the pulses represent the low state (trough) of the sine. A square wave modulation is preferred in some cases because it can be implemented using simple digital circuits. Whether pulsed or continuously modulated, the underlying measurement principle is the same: a phase difference is estimated and from there the distance deduced from it.

A different approach of i-TOF using square wave modulation is employed by Kim et al. in U.S. Pat. No. 8,217,327B2: they modulate using a short and a long pulse during an overlapping time interval. These two pulses add up such that the emitted pulse shows an asymmetry in amplitude. The detector accumulates a charge based on the amplitude of the detected light. Because of the asymmetry in the effectively emitted pulse, also the charge detection shows an asymmetry. By reading out the accumulated charge at a predefined phase difference the distance can be deduced similar to methods that determine phase difference $\phi$, but by avoiding the demodulation.

The presence of several of such TOF systems in the same environment—most noticeably when they are facing the same direction—may interfere with the individual measurements. For example a pulse can be detected that was emitted by a second system. This interference can lead to the detection of wrong distances.

Detecting the wrong distance can be dangerous for example if the TOF system is supposed to observe the environment around an automated guided vehicle. This problem is known under various names such as multi-camera, multi-user, inter-system interference, and crosstalk scenario.

The multi-user environment is well known in the art and some solutions are proposed. Nonetheless, these methods have several short comings. In general these methods can be characterized as either a form of (time-)multiplexing or encoded communication.

In time-multiplexing, the participating systems are active during different time slots. As a consequence the different systems cannot be disturbed by one another. One way to achieve this is to let the different participating systems to communicate on a separate channel by means of a central coordination unit. On such a separate channel the systems can negotiate which of them can use what time slot. Otherwise, in a controlled environment, no live negotiation is necessary, and the time slots can be assigned offline. This type of time-multiplexing is stated for example in US2014340487. The disadvantage in requiring a central coordination unit are increased costs and needed effort to install a multi-user environment. On top of that, it also decreases the maximum possible number of participating systems, as with each additional one the usable time slots get smaller, because the total available time stays constant.

Time-multiplexing relies on that either the environment is fixed and controlled, or that at least all TOF systems which enter the environment cooperate with the already present systems. It is potentially dangerous to rely on the cooperation of foreign systems, as for example different manufacturers could use different protocols. And even if an industry wide standard is agreed upon, previous generation systems, or intentionally malicious participants, can jeopardize the multi-user environment.

Another strategy of time-multiplexing that doesn't rely on the cooperation of third party TOF systems is disclosed in WO2013127973: they propose to irradiate and detect at random intervals. The smaller the duty-cycle of the individual TOF device, the higher the likelihood that no second TOF device is currently irradiating the environment.

The accuracy of an estimated TOF value is typically improved for longer acquisition times because the signal-to-noise ratio (SNR) usually improves as more measurement samples are taken into account. This fact counteracts the desired shortening of the acquisition window; i.e. the small duty-cycle just mentioned, in order to address more and more participating systems with random detection intervals.

When the time slots for detecting are chosen randomly, there is a certain probability that two or more systems are active at the same time. This time slot collision probability increases with the number of participating systems. Hence, at any given time an unknown amount of TOF systems are probing the environment.

On the other hand, while the number of active secondary systems is not known, it could be assumed that during every measurement different systems are probing. These secondary systems are expected to pollute the measurement, by effecting wrong measurement values from time to time. However, by postprocessing the N last measurements the correct TOF value could be filtered out. This is in line with for example the proposal by Li et al., "Multi-camera interference cancellation of time-of-flight (TOF) cameras" ICIP, conference (2015), doi:10.1109/ICIP.2015.7350860.

The inherent problem to such postprocessing solutions is the added latency: an accurate value can be reported only after N measurements. Typically, this is an undesired property in applications that rely on real time data, such as for example in automotive. Furthermore, if the probed target moves during these N measurements, i.e. the real distance is not the same for all those N single measurements, the postprocessing unit has to overcome additional difficulties.

Analogous to time-multiplexing other types of multiplexing, like frequency-multiplexing (in lidar frequency is commonly referred to by its reciprocal quantity wavelength) can be thought of; this is known, for example, as wavelength division multiplexing (WDMA).

In reality, the possibilities of such frequency/wavelength-multiplexing strategies are, however, very limited for a multi-user environment. For one, a TOF system irradiates into free space. The allowed frequencies to use for radar are highly regulated. Secondly, lidar systems would have considerably more regulatory freedom, but realistic wavelength band pass filters limit the available number of options considerably. Additionally, a wavelength multiplexed multi-user environment would need to be oversighted and controlled as it needs a central coordination unit assigning wavelengths for newly entering participants in such a way that said wavelengths would not match that of already present systems.

In another category, there are several proposals to deal with multi-user interference by adopting strategies known from communication theory. The idea is usually to encode a random, pseudo-random, or a chaotic pattern in at least one arbitrary parameter of the emission. On detection side a filter is applied to let through only the matching pattern. The idea behind these patterns is that the emission from a foreign source, e.g. from a secondary TOF system, cannot be distinguished from background contributions. This principle is known under the term pseudo-noise modulation.

With this pseudo-noise modulation it is possible that one system exchanges a modulation pattern between emission and detection that does not match the same pattern of a second system. Instances of such patterns are given, among others, in for example Griep et al. "Poly-Phase Codes and Optimal Filters for Multiple User Ranging," IEEE Trans. Aerospace and Eelctr. Sys., 31(2), 1995, doi: 10.1109/7.381922 and Rieger et al. "Range ambiguity resolution technique applying pulse-position modulation in time-of-flight scanning lidar applications," Opt. Eng. 53(6), 2014, doi: 10.1117/1.OE.53.6.061614 (or Rieger et al. US2012257186 correspondingly).

Random patterns can be generated by employing physical randomness, as found for example in a coin toss, or thermal jitter, or radioactive decay. Real random numbers are often not desired as they are not controllable and can bring in unfortunate dependencies and correlations.

A pseudo-random pattern is created with a deterministic algorithm but in such a way that they look random; meaning, when investigating their mathematical properties with tests such as n-cube-test, $\chi^2$-test, spectral test, etc. a pseudo-random patterns cannot be distinguished from real-random patterns.

An often used implementation of pseudo noise (de-) modulation is the so-called maximum length sequence, or m-sequence for short. These m-sequences can be interpreted as a generalization of the square wave modulation mentioned above: square pulses are emitted with, for example, varying durations of high and low state. The auto-correlation of the whole sequence is a triangle function, approximating a Kronecker-delta function.

The base of this triangle is system design specific, and the corresponding time delay called chip time Tc: If the absolute measured delay is less than one chip time, the demodulator samples the autocorrelation function on one of the two sides of the triangle; from which a phase shift, and thus distance, can be determined. If the delay, however, is more than one chip time, the demodulator samples the autocorrelation function outside the triangle, where it is identical to zero. Foreign sequences are also demodulated to zero, after probing the whole sequence—this is the definition of the Kronecker-delta property—such that multiple systems can be present in the same environment, each of which detects a position within the triangle plus the zero contributions of the others, which thus do not interfere with the measurement; at least in theory.

In reality, m-sequences have several short comings in a multi-user environment. First of all, these TOF systems need to detect the entire m-sequence. The Kronecker-delta property is given for the whole sequence, the autocorrelation of subsequences is not guaranteed to be zero. The more participating devices are to be expected, the longer does the sequence need to be to ensure the advantageous auto- and cross-correlation properties. A long sequence represents a long measurement, and thus a slow system.

Secondly, the full sequence needs to be detected with little margin for error. If some of the bits are missed, because the target is at a large distance or weakly reflective for example, the auto-correlation doesn't match and the detected sequence is discarded as noise. Relatively few missed pulses can mean the whole m-sequence needs to be probed again.

Thirdly, the Kronecker-delta property is true only if the whole m-sequence is considered. This means especially, if two TOF systems work with sequences of different lengths, the longer sequence can lead to a non-zero demodulation result in the short sequence system, which would subsequently be interpreted as a phase shift and distance. This last point is particularly detrimental in non-cooperative multi-user environments.

As mentioned above, any emission parameter can be modulated with pseudo-noise. Bamij et al. (U.S. Pat. No. 7,405,812 for Canesta) proposed a i-TOF system in which they incorporate the pseudo-noise modulation on the emitted frequency (so-called frequency hopping): the demodulation favors to detect a signal whose modulation frequency correlates to the emitted one. Varying this frequency (pseudo) randomly reduces the likelihood that a secondary TOF system emits the same radiation at any given time. In Hu et al. "Correlation Property Analysis for the Pulse Position Modulation Sequence used for Non-Crosstalk Sonar Systems," IEEE CISP, Volume 5, 2011, doi: 10.1109/CISP.2011.6100772 (2011), Meng et al. "Frequency-Hopping Pseudo-Random Pulse Width Modulation to Eliminate Crosstalk of Sonar Sensors in Mobile Robots," IEEE IROS, conference, 2006, doi: 10.1109/IROS.2006.281690 (2005), and Buettigen et al. (US20110299059 for Mesa Imaging) the modulated parameters are the pulse width or position. In Oggier et al. (EP2594959 for Mesa Imaging) they modulate the phase (phase hopping). In Szajnowski et al. (U.S. Pat. No. 8,031,106 for Mitsubishi Electric Corporation) the pseudo-noise is encoded in high-frequency state, low-frequency state, and the two transitions in between.

Pseudo-noise patterns generated by the means of pseudo-random number generators (RNG) repeat themselves after a certain sequence length. Some systems rely on this repetition, such as the above described m-sequence. For many other applications, however, this poses an undesired vulnerability. To avoid the repetition the emitted pulse pattern can be mixed with the detected pattern in a feedback loop as for example declared in Wohlenberg et al. (DE20131002651 for Volkswagen). Another way to avoid the repetition is to generate the pseudo-noise with a chaos generator instead of an RNG as disclosed in Sushchik et al. "Chaotic Pulse Position Modulation: A Robust Method of Communicating with Chaos," IEEE Com. Lett. 4(4), 2000, doi: 10.1109/4234.841319, Rulkov et al. "Digital Communication Using Chaotic-Pulse-Position Modulation," IEEE Trans. on Circ. and Sys. I, 48(2), 2001, doi: 10.1109/TCSI.2001.972850, and Fortuna et al. "Chaotic Pulse Position Modulation to Improve the Efficiency of Sonar Sensors," IEEE Trans. Instr. Meas., 52(6), 2003, doi: 10.1109/TIM.2003.820452 who went on to protect their invention as disclosed in U.S. Pat. No. 6,738,313B2. Chaotic systems are still deterministic systems, in principle, but they depend heavily on the exact initial conditions, which makes them unpredictable, and which is in some cases not desirable.

Most of the above cited solutions refer to i-TOF implementations. But the basic ideas could also be ported to d-TOF systems. In Rieger et al. (US20120257186 for RIEGL) for example they employ pseudo-noise to overcome the round-trip ambiguity of a d-TOF system: instead of measuring the TOF of single pulses, they propose to measure the TOF of pulse sequences. By assigning every participant with such a randomly looking identifier code, the principle could be directly ported to multi-user environments. Such an approach is for example discussed in Griep et al. "Poly-Phase Codes and Optimal Filters for Multiple User Ranging," IEEE Trans. Aerospace and Eelctr. Sys., 31(2), 1995, doi: 10.1109/7.381922.

The solutions derived from communication theory rely on relatively long sequences. This way they increase the likelihood that the identification pattern is unique. However, as the TOF system needs to detect the identifier sequence, estimating the TOF value is typically slow; in particular for m-sequences as was elaborated on above. Secondly, when the emitted—and the detected—pulse patterns need to be stored in memory, before they can be processed and compared, lengthy sequences represent a clear drawback: for a TOF system based on a multitude of receivers (e.g. an array) this is a costly hardware constraint. Third, in a solution similar to the proposal by Rieger et al. "Range ambiguity resolution technique applying pulse-position modulation in time-of-flight scanning lidar applications," Opt. Eng. 53(6), 2014, doi: 10.1117/1.OE.53.6.061614 the matched filter relies on the assumption that "each laser emission results in one single laser echo". Or, in other words, per emitted pulse only one pulse echo is allowed to be recorded; either the echo of a transmitted pulse, or a secondary pulse. In a multi-user environment this assumption cannot be made—except in the case of time-multiplexing, but in such a case pseudo-noise encoding wouldn't be necessary.

Beside the assumption to get not more than one echo, it is also required to detect not less than one pulse echo. Some detectors, such as for example single-photon avalanche diodes (SPADs), show a dead time after detecting an (in this case, single photon) echo. In general, a dead time can be understood as a time interval during which the detector cannot detect, so that some echoes are missed (wrong negatives), or because the detection read-out is busy while transmitting the detection event, or again with the example of a SPAD where the dead time represents the time between the generation of one avalanche, and the full recharge of the diode. In order to detect two consecutive pulses, such a detector thus would require the pulses to be spaced in time of at least its dead time. In the case of an uncontrolled multi-user environment a pulse from a secondary system could therefore blind the detector during the time the real echo arrives. In the case for example of an m-sequence implementation, this negatively impacts the autocorrelation which thus increases the likelihood to need to measure longer, and thus slow down a distance acquisition.

A particular group of malicious multi-user environment participants are so-called spoofers or jammers. These systems try to inject wrong distance measurements, so that the TOF system would see a wall where there is none, or to force the TOF system to report inconsistent distances. One such jammer is for example disclosed in Borosak WO2015128682: their system detects the average pulse repetition rate of a targeted lidar system; including the statistical distribution in the case this targeted lidar system applies a form of random delays. Said lidar jammer detects for example an average pulse delay of 1 µs, corresponding to 1 MHz, with random delays in steps of 0.1 µs. Said lidar jammer thus synchronizes with the targeted lidar system and emits at 10 MHz.

This jammer doesn't know the pseudo-random pattern of the targeted lidar system, and thus cannot predict future delays. But by exploiting realistic limitations of hardware implementations of such (pseudo-)random patterns their strategy can jam such TOF systems nonetheless. The multi-user scenario has to address this type of participants as well.

The present invention proposes a solution to the multi-user scenario that manages a TOF device at a local level. Therefore, there is no need for a control or coordination unit. The disclosed method to deal with the multi-user environment provides a possibility and an incentive for different TOF devices to cooperate via an independent channel, but without relying on the benevolence of such participants. The present invention is immune to both intentionally and unintentionally malicious multi-user environment participants.

DISCLOSURE OF THE INVENTION

It is an aim of this invention to provide a method and a device for measuring a distance to a target in a multi-user environment by means of at least one sensor wherein the measured TOF is immune to both intentionally and unintentionally malicious multi-user environment participants.

According to the present invention, the aforementioned aim is achieved with a method for measuring a distance to a target in a multi-user environment by means of at least one sensor, comprising:
- irradiating the environment by means of a series of radiation pulses, wherein series of radiation pulses are emitted at a determined repetition rate and with a determined random delay;
- collecting pulses that are reflected or scattered from the environment to at least one detector connected to at least one chronometer;
- assigning a timestamp at the detection of a pulse;
- subtracting the added delay from the registered timestamp coming from the chronometer, the result corresponding to the time of arrival (TOA);
- determining the statistical distribution of said time of arrivals;
- determining the distance to the target from said statistical distribution.

Preferably, the step of determining the distance from the statistical distribution of said TOAs consists in determining the TOA that appears most often in the distribution with respect to the randomly distributed noise contribution, said TOA corresponding to the time of flight (TOF).

Advantageously, the pulse repetition rate (PRR) is varied for every distance measurement.

Moreover, each TOF system broadcasts via an independent channel a determined pulse repetition rate (PRR) to the other TOF systems.

Preferably, each TOF system broadcasts via an independent channel at least two different determined pulse repetition rates (PRRs) to the other TOF systems.

Another object of the present invention concerns a device for measuring a distance to a target in a multi-user environment comprising:
- at least an irradiation device of said environment providing at least a series of radiation pulses at a determined repetition rate and with a determined random delay;
- at least one detector arranged to detect the reflected pulses from the environment from at least said emitted pulses and connected to at least one chronometer;
- at least means for assigning a timestamp at the detection of a pulse;
- at least means for subtracting the added delay from the registered timestamp coming from the chronometer, the result corresponding to the time of arrival (TOA);
- at least means for determining the statistical distribution of said time of arrivals; and
- at least means for determining the distance to the target from said statistical distribution.

Preferably, the means for determining the distance from said statistical distribution of TOAs consists in means for determining the time of arrivals that appears most often in the distribution with respect to the randomly distributed noise contribution, said time of arrivals corresponding to the time of flight.

Furthermore, it comprises at least means for varying the pulse repetition rate (PRR) for every distance measurement.

Moreover, it further comprises means for broadcasting via an independent channel a determined pulse repetition rate (PRR) to the other TOF systems.

Preferably, it further comprises means for broadcasting via an independent channel at least two different determined pulse repetition rates (PRRs) to the other TOF systems.

BRIEF DESCRIPTION OF THE DRAWINGS

The invention will be further elucidated by means of the following description and the appended drawings.

DESCRIPTION OF PREFERRED EMBODIMENTS

Figure 1:
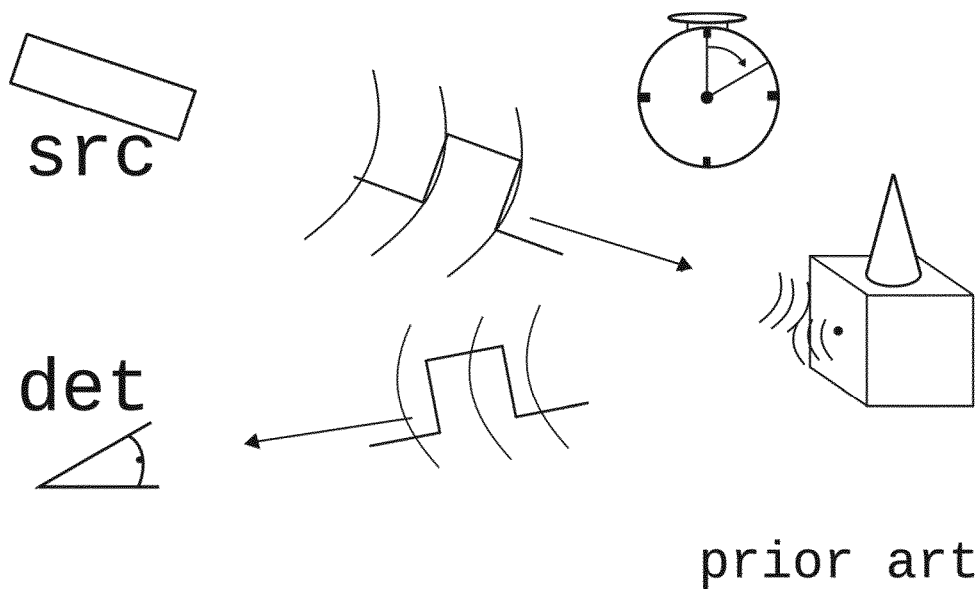
FIG. 1 is a schematic representation of a direct TOF system of prior art.
Figure 2:
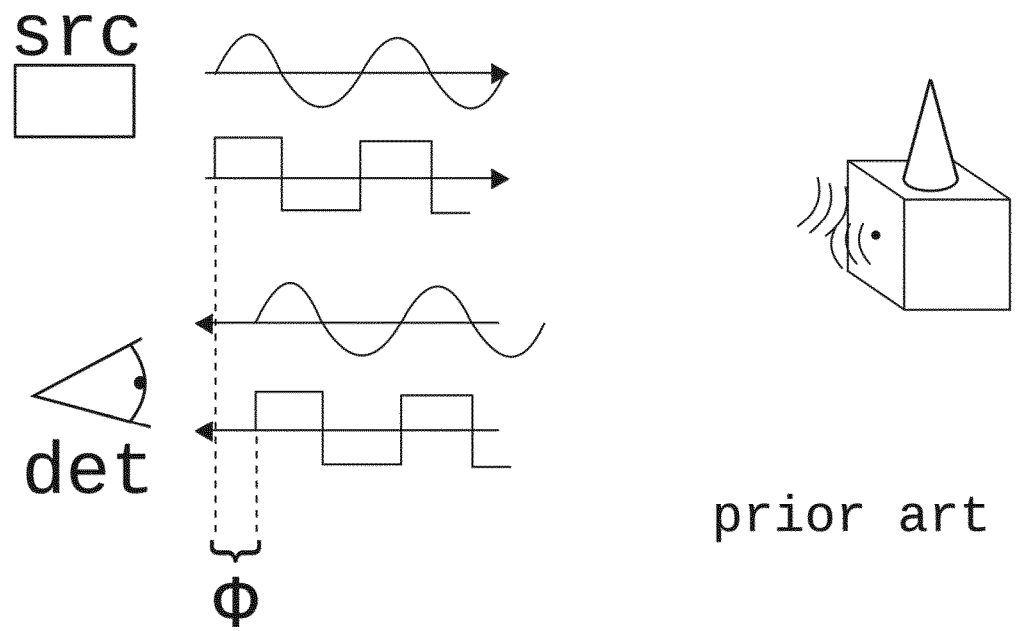
FIG. 2 is a schematic representation of an indirect TOF system of prior art.

The present invention will be described with respect to particular embodiments and with reference to certain drawings. The invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Figure 3:
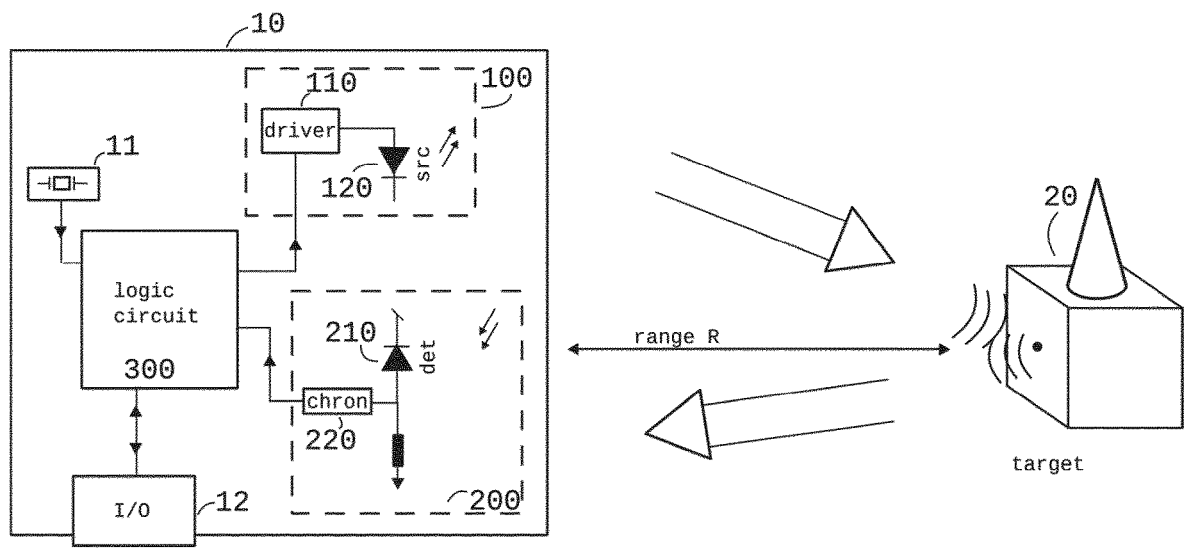
FIG. 3 is a schematic block diagram of the TOF system according to the invention.
Figure 4:
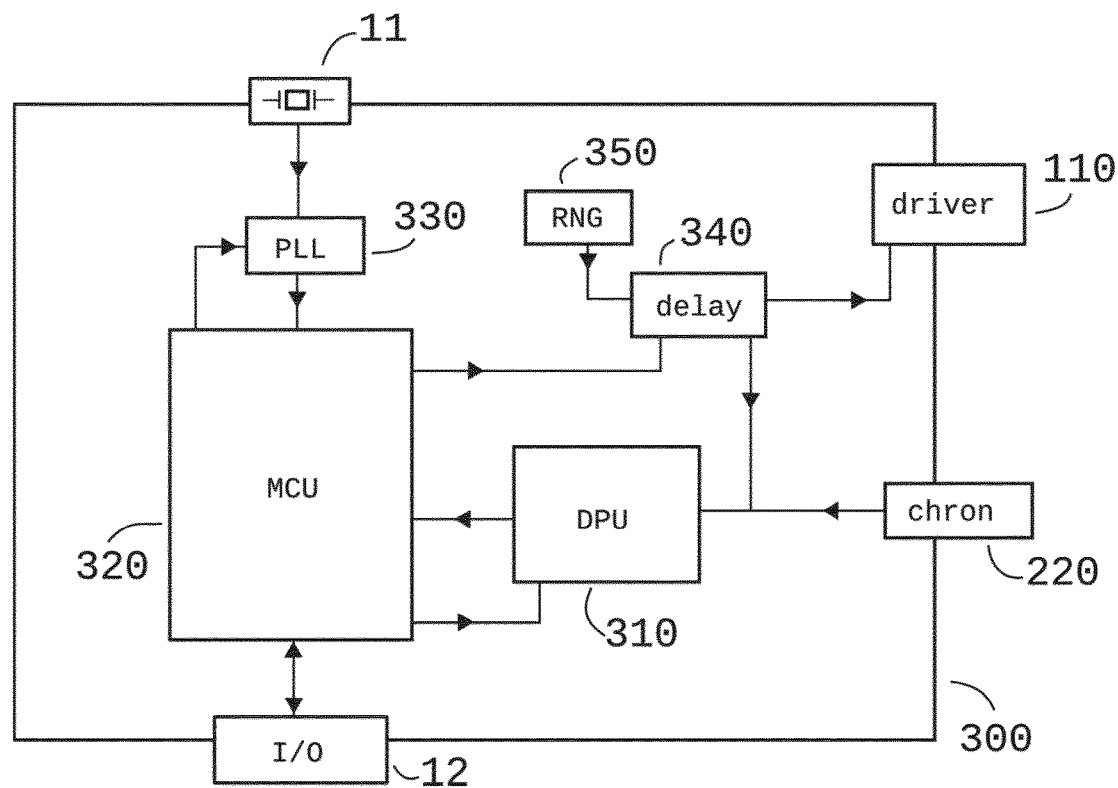
FIG. 4 is a schematic block diagram of the logic circuit of the TOF system according to the invention illustrated in FIG. 3.

Referring to FIG. 3, one embodiment of the present invention is a distance ranging system composed of at least three components: a light emission circuit (100), a detection circuit (200), and a logic circuit (300). FIG. 3 illustrates such a time-of-flight (TOF) system (10) at a distance R from a target (20). More precisely, the preferred embodiment of the present invention is a version of direct TOF (d-TOF) light detection and ranging (lidar). The TOF system has an interface (12) allowing it to communicate with a host machine which utilizes the system to range its environment.

The logic circuit—of which several embodiments are given in FIG. 4 and FIG. 8-10, respectively—has the task to control, evaluate, and communicate the measurement in the fashions described below. The measurement control unit (MCU) (320)—which can be a microprocessor, FPGA, a finite state machine, or similar—thus coordinates the measurements according to what the host machine requests via interface (12). This MCU allows abstracting from the request of the host machine—to acquire a distance measurement, or intensity, or the like, as described below—and the steps to be applied according to the present invention.

As such the present invention employs pulsed lasers (at least one source) on emission side, represented by a laser driver (101) and a light source (102), which for example could be a vertical-cavity surface emitting laser (VCSEL). Other types of lasers, such as edge emitters, or other light sources such as LEDs, could be used as well. The system according to the invention comprises at least one single-photon avalanche diode (SPAD) (210) (such as described by Niclass et al. (U.S. Pat. No. 8,168,934B2)) for instance as detector. But other detectors, such as for example avalanche photo diodes (APDs), or silicon photon multipliers (SiPMs), could be used as well.

Said detector is connected with at least one chronometer (220) providing a reliable time base, and in particular providing a timestamp for a pulse detection. This chronometer is typically a time-to-digital converter (TDC) as for example described in WO2013034770, but also a time-to-analog converter (TAC) (e.g. U.S. Pat. No. 6,479,986), or a synchronous counter (US2002015467) counting elapsed cycles of a high speed (typically in the order of GHz) clock, or a simple delay line could be used.

The TOF measurement relies on the detection of physical radiation of some sort. This radiation can be of electro-magnetic (em) radiation in the optical range 1 THz), as well as radio and microwave (<1 THz), and/or also acoustic waves are possible. To emit and detect radio and microwave radiation one typically implements antennas (U.S. Pat. No. 8,031,106). For acoustic waves for example loud speakers and microphones, or piezo-electric transducers (U.S. Pat. No. 6,738,313B2) could be employed. Detecting a pulse could involve identifying a change in radiation amplitude in time domain, as for example used in US20120257186; but can also be interpreted as a change in frequency (/wavelength) domain, as for example described in U.S. Pat. No. 8,031,106.

In the preferred version of TOF ranging a distance measurement consists of several single acquisitions of the time-of-arrival (TOA) of detected pulse events coming from the detector. These single TOA acquisitions (311) are entered into a data processing unit (DPU) (310).

The DPU (310) has the task to statistically process the discrete distribution of timestamps coming from the chronometer (220) during the integration time, and to output values representing measurement quantities such as for example distance, or intensity, or the width of the detected pulse, or the number of detected pulses, or a combination of such quantities, along with potentially confidence levels for each of the reported quantity, depending on what the MCU requests.

Figure 5:
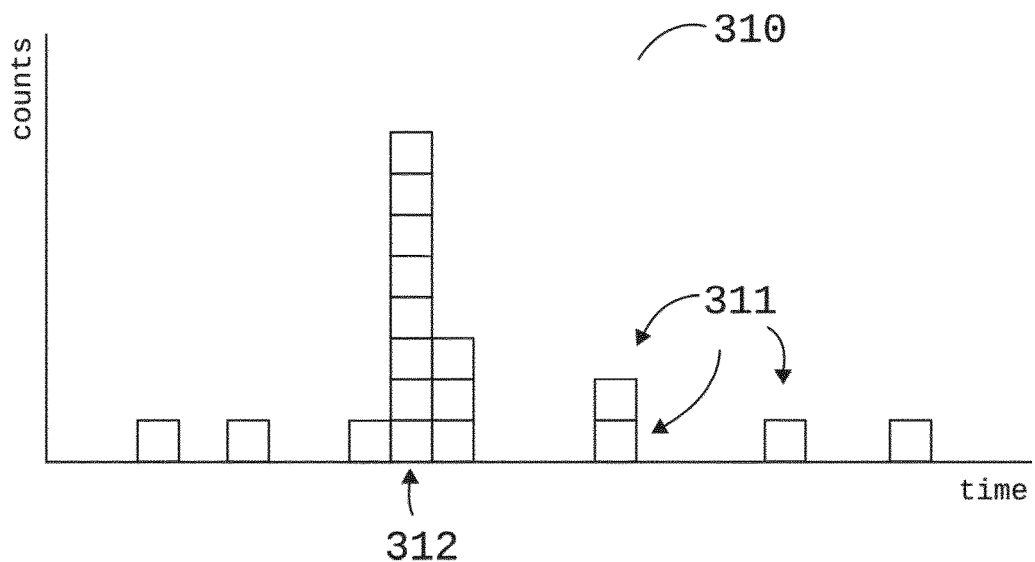
FIG. 5 is a histogram highlighting various time of arrival (TOA) entries and the corresponding time of flight (TOF) position.

This task can be achieved in a variety of ways. One possibility is based on histograms as implemented e.g. in US20150377677 and WO2016063028, and is illustrated in FIG. 5.

It should be noted, however, that a histogram is only but one option to achieve this task without departing from the scope of the invention. Data stream algorithms, such as described in for example Cormode et al. "Finding frequent items in data streams," VLDB, 2008, could be used as well. The given pseudocode examples facilitate their implementation considerably. In the rest of the description a histogram implementation is assumed, as this option allows introducing relevant concepts step by step.

In general there are three possible sources of TOA events: pulses originating from the TOF system's own emitter; other pulses present in the environment (such as electronic circuits or lamps, or from nature such as sun or animal sounds); and thermally induced events within the detector itself without the incidence of a pulse. The first source is considered as the signal contributions. They are synchronized and therefore time correlated with the detector. The latter sources are considered as noise contributions. They are randomly distributed in time. The signal contributions can be discriminated from the noise contributions through statistical processing.

In a histogram implementation of the DPU the number of occurrences of each TOA value is recorded. After a certain integration time, because of the statistical processing, the signal contributions stand out from the noise contributions, as illustrated in FIG. 5 by peak (312). Given such a statistically processed histogram various methods can be applied to extract the corresponding TOF value. For example the DPU could report the identifier of the histogram bin containing the maximum counts. Or a more sophisticated algorithm such as discussed in Blais et al. "Real-time numerical peak detector," Signal Processing 11, 145-155, 1986 could be implemented.

Alternatively, the DPU could report for example on the delimiter from which to which bin the peak exceeds the noise floor.

Methods have been developed, based on the idea to exploit the statistical difference between signal and noise, in order to decrease the number of noise counts in the histogram: either by recording only events that are detected in coincidence with at least one other event (C. Niclass, "A 100 m-Range 10-Frame/s 340×96-Pixel Time-of-Flight Depth Sensor in 0.18 m CMOS," IEEE, (2011)), or that the number of detected photons have to exceed a certain threshold before being considered, thus allowing for a variable dynamic range of detection, see Niclass et al. (WO2010149593 for Toyota).

In a multi-user scenario environment, an additional noise source has to be considered: the signal of a foreign TOF system.

Figure 6:
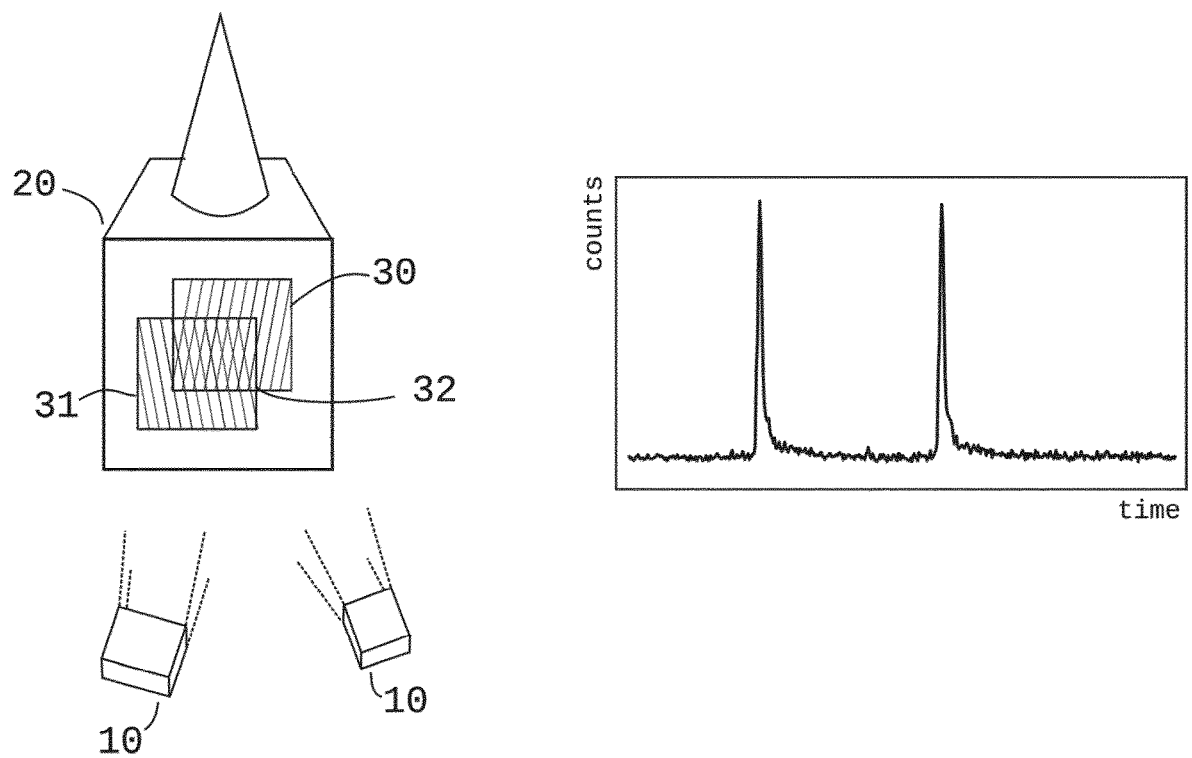
FIG. 6 is a schematic representation of the multi-user problem.

Referring to FIG. 6, two equivalent TOF systems (10) according to FIG. 3 are illustrated to irradiate the target (20) with each their corresponding field of views FOVs (30, 31), which is shown to partially overlap (32). Plotted alongside is a histogram seen by one of the two TOF systems displaying multiple peaks. One of the peaks shown corresponds to the correct distance between TOF system and target. The other peak occurs with a certain time delay given by the relative distances between the different radiation sources, and the phase difference between the emission of the own transmission and the foreign radiation source. In a scenario of three or more such TOF systems correspondingly more peaks would appear. For the occurrence of these foreign peaks a partial overlap (32) of the FOVs is sufficient, but not necessary.

Figure 7:
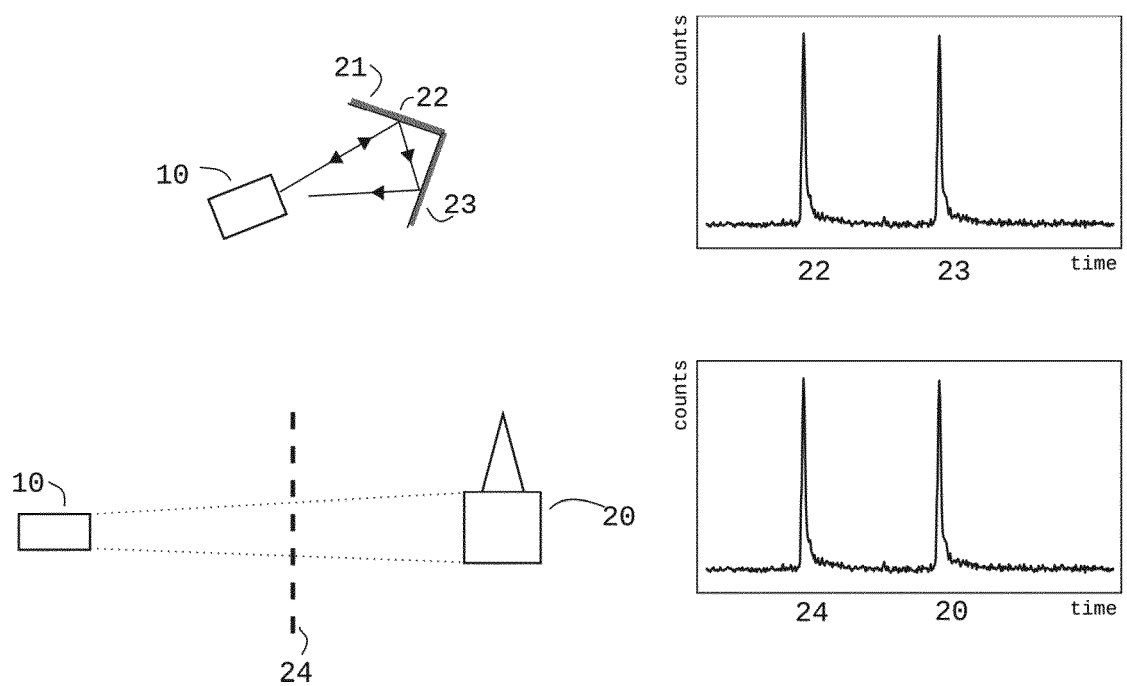
FIG. 7 is a schematic representation of the occurrence of multi-peaks without the presence of a second system according to the invention.
Figure 8:
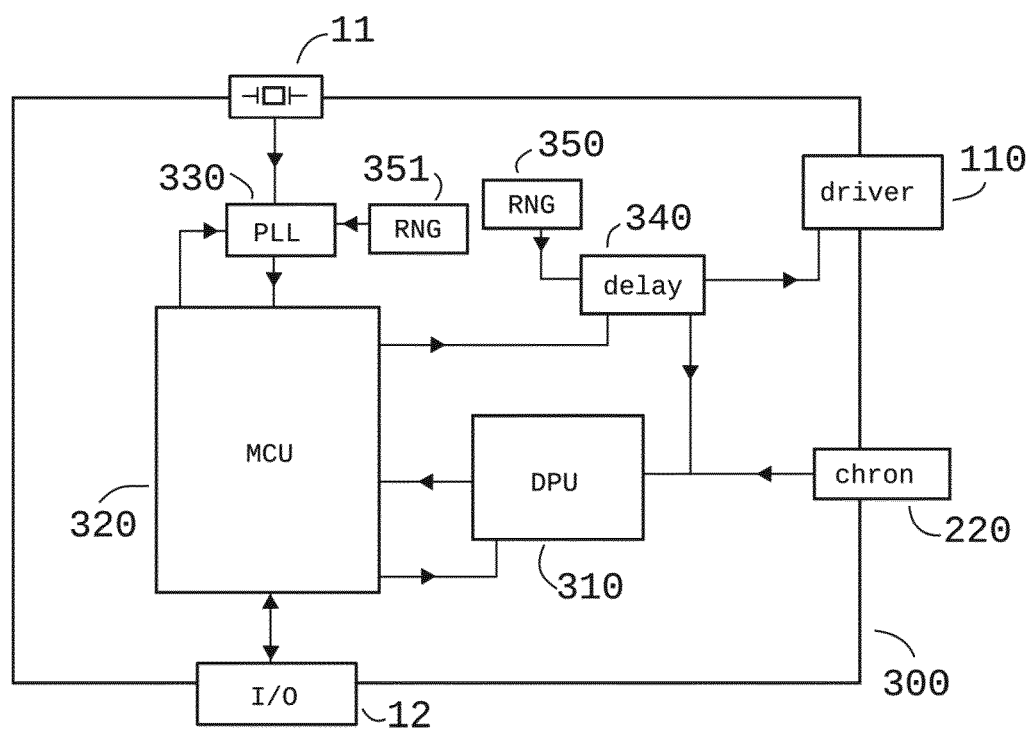
FIG. 8 is a schematic block diagram of a second embodiment of the logic circuit of the TOF system according to the invention illustrated in FIG. 3.

Referring to FIG. 7, it is important to stress that there are situations in which a TOF system can see multiple peaks (i.e. multiple distances) without the presence of secondary TOF systems. One such case relates to multi-path detections when irradiating for example a corner (21) which results in a distance corresponding to a first surface (22) and a second surface (23). Another scenario that leads to a multi-peak detection is given in the case a semi-transparent object (such as a net or a fence) (24) resides between TOF system (10) and target (20). These examples show that detecting the occurrence of a secondary peak is not sufficient to unambiguously determine the presence of a secondary TOF system.

Noise contributions due to secondary TOF systems cannot be circumvented with coincidence or threshold detection, as there indeed is a higher concentration of pulses corresponding to the detection of these fake distances.

For the sake of simplicity, in the following detailed description we restrict ourselves to mention two TOF systems in the multi-user environment; system A, that implements the disclosed invention, and system B, with an arbitrary, possibly unknown third-party implementation. Again for the sake of simplicity, we assume this system B to show the same characteristics as the present invention. These restrictions facilitate communication, but as shall be seen the present invention is applicable for an arbitrary and unknown number N of participating systems.

At first we assume system B to emit at a fixed pulse repetition rate, say $f_{PRR}^{(B)}$=1 MHz. If system A emits and reads out at the same repetition rate, the pulses of B would build up a peak in the histogram of system A. This is again exactly the description of the multi-user scenario without mitigations, as displayed in FIG. 6. In order to circumvent this interference, in one embodiment of the present invention the MCU (320) varies the pulse repetition rate (PRR) for every distance measurement. For example, the system clock (11) could run at 100 MHz with which the MCU has access, for example by a division factor of 100, to 1 MHz. By changing the division ratio from 99, to 100, to 101, and back, at least some of these measurements are acquired in the condition of $f_{PRR}^{(A)\prime} \neq f_{PRR}^{(B)}$. In this case the pulses of B are not synchronized with A, the detections are scattered throughout the histogram of A, and no wrong peak could form.

Except, for this embodiment to work properly in a totally uncontrolled environment it would have to recognize the fact that a second system is present. Otherwise it doesn't know the significance of the second peak appearing in some of the distance measurements as mentioned above. Secondly, with this embodiment, system A, would still have to measure a multitude of pulses in order to discriminate its own pulses from those of B, i.e. compare the occurrences of peaks in different distance measurements and discard the one peak that doesn't appear in all of them. Such an endeavor becomes more and more cumbersome the higher the number of participating systems in the multi-user environment. During this time system B could change its pulse repetition rate $f_{PRR}^{(B)\prime}$ and again end up with the same pulse repetition $f_{PRR}^{(A)\prime} = f_{PRR}^{(B)\prime}$, especially if system B happens to apply the same algorithm to change the division ratio as system A. Additionally, the multi-user scenario needs to account for malicious participants. A simple frequency or pulse repetition rate hopping implementation cannot avoid a system that intentionally changes to a matching pulse repetition rate.

For these reasons, in another embodiment of the present invention system A thus emits at a certain pulse repetition rate $f_{PRR}^{(A)}$ and applies a random delay $t_k$ (340) given by random number generator (RNG) (350) before emitting a pulse. For example, given the 100 MHz system clock and an average $f_{PRR}$=1 MHz there is on average a new pulse every 1 µs. The additional delay could, for example, be a multiple of the inverse of the 100 MHz system clock mentioned earlier, i.e. a multiple of 10 ns, on top of the regular 1 µs delay.

On detection side the same delay $t_k$ is subtracted from every registered TOA coming from the chronometer (220) until another pulse is emitted with a new delay $t_{k+1}$. At this point the old delay $t_k$ can be forgotten. These detected and subtracted timestamps are relayed further to the DPU (310).

Since the emission of such a source has the statistical properties of random noise, a secondary TOF system doesn't see a coherent peak to build up in its histogram. On the other hand, system A does register a peak in its own histogram, because due to subtracting the emission delay, the detected echoes corresponding to TOF all appear at approximately the same TOA. I.e. the DPU of system A does not see the random nature of its own emission.

It should be noted that this mode of operation is significantly different from for example m-sequence demodulation, introduced in the background of the present invention, where the properties of the emitted pattern can lead to missing the correct echo altogether, if for example the underlying phase shift is too large.

The system according to the invention has no need to store the sequence of applied random delays for the use in a matching filter. Nor does the system according to the invention rely on detecting a whole (sub)sequence of randomly emitted pulses; as is for example the case in m-sequence pseudo random (de)modulation. As pointed out by Rieger et al. "Range ambiguity resolution technique applying pulse-position modulation in time-of-flight scanning lidar applications," Opt. Eng. 53(6), 2014, doi: 10.1117/1.OE.53.6.061614, a matched filter is based on the convolution of a signal sequence with its impulse response. This requires to modulate (/demodulate) the emission (/detection) with a known, determined signal sequence. The system according to the invention does not rely on such known or determined sequences. The system according to the invention puts itself in a non-continuous and random, different time reference frame than any other system.

One important consequence of the non-continuous and random time reference frame and its inherently statistical nature to distinguish between background contributions and its own pulses is its insensitivity to the loss of transmitted pulses. On the level of an individual detection, false positives and false negatives are not detrimental to the overall distance measurement.

The described strategy to apply a random delay to the pulse emission and subtracting this delay from every detection until a new pulse is emitted, allows individual TOF systems to not interfere with each other, even if they emit at the same average pulse repetition rate PRR. Nonetheless, in the case said participants emitted at different PRRs, the spread of the detected secondary peaks would further increase. This is beneficial for the SNR in the histogram of each participant. Based on this reasoning another embodiment of the present invention applies a (pseudo-) randomly chosen different PRR for every distance measurement.

For every distance measurement the MCU (320) requests an average PRR from the programmable clock (PLL) (330). This request can be interpreted as ordering a certain division factor (say 100) to obtain 1 MHz. The actual division factor obtained is modified by the RNG (351) as sketched in FIG. 8. The average repetition rate is generated with for example a division factor of 99 or 101, or indeed 100 as requested.

There are several reasons the MCU wants to measure a distance whereas the PRR suffices to be only approximately the requested value. For example, a certain PRR defines the round trip ambiguity of said distance measurement. A 1 MHz PRR corresponds to about 150 m round-trip (assuming the propagation speed being the speed of light). If the overall TOF system is design limited to say 100 m then also a 1.5 MHz PRR allows a pulse spacing of this limiting ambiguity range. The acceptable variation to the division factor hence goes from 100 (for 1 MHz) to 67 (for 1.5 MHz), so that a 5-bit RNG code could modify the requested approximate PRR. Other reasoning on system level can bring up other desired limitations or flexibilities; this example merely illustrates one possibility.

Figure 9:
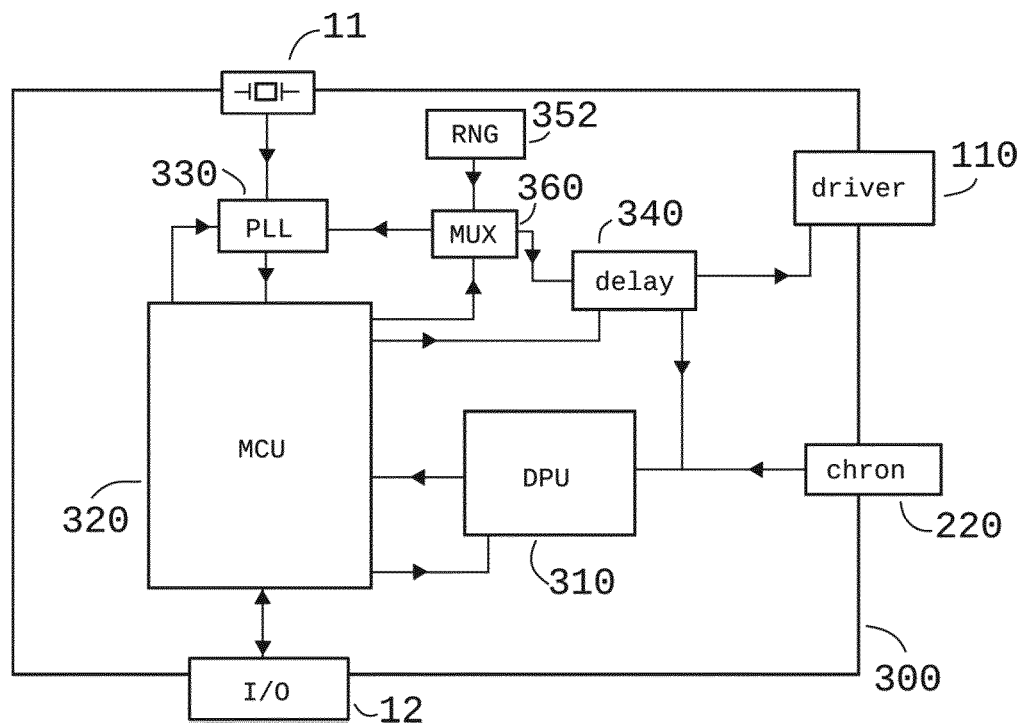
FIG. 9 is a schematic block diagram of a third embodiment of the logic circuit of the TOF system according to the invention illustrated in FIG. 3.
Figure 10:
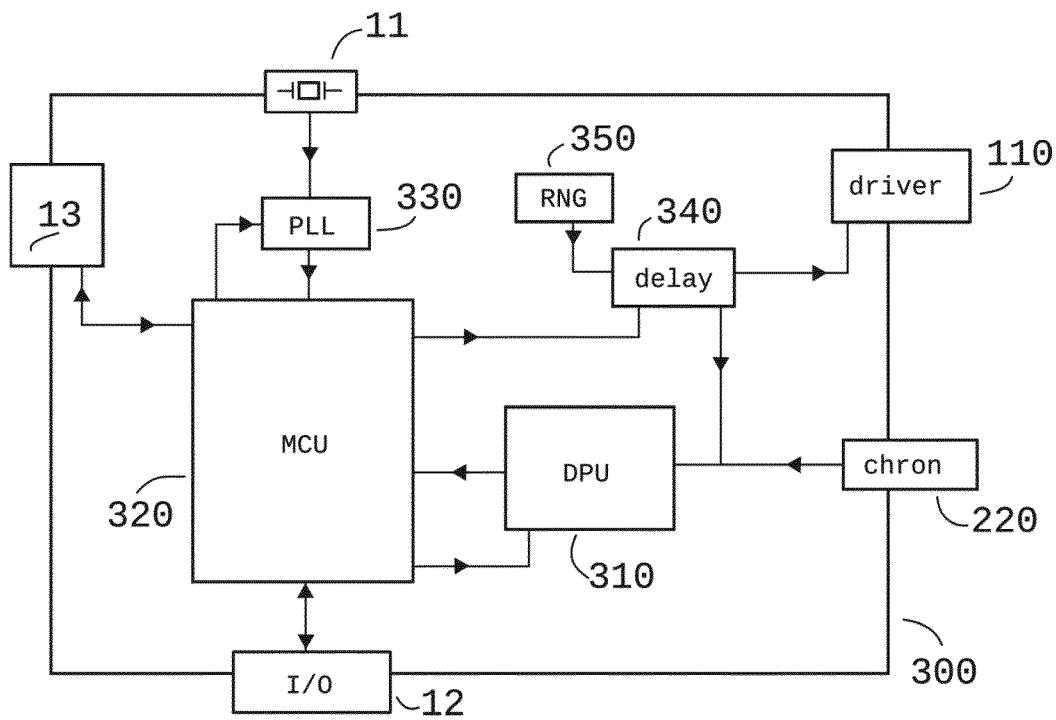
FIG. 10 is a schematic block diagram of another embodiment of the logic circuit of the TOF system according to the invention illustrated in FIG. 3.

Referring to FIG. 9, yet another embodiment can make use of the same RNG (352), but switched via multiplexer (360) controlled by the MCU (320).

Additionally, the stated SNR benefits create an incentive for participating TOF systems to cooperate. For example the TOF systems could broadcast via an independent channel (13) illustrated in FIG. 10—such as bluetooth, wifi, etc.—what average PRR they chose, which the other systems would try to avoid, in order to improve their own SNR.

This communication is not necessary in order to ensure non-interference, as this is largely already provided by the random delays on each pulse emission. However, a malicious participant could try to exploit the declared information and to emit at this PRR. For this reason a preferred implementation of such a communication would broadcast at least two different PRRs, so that the malicious participant would have to choose one of the declared PRRs by chance. In order not to indicate the start of a new measurement said broadcast could be made with a certain (random) shift ahead in time, before applying the PRR. This removes the problem given when the TOF system cannot know which among the participating systems are trust-worthy. Typically, the systems don't communicate out of fear a defecting participant could corrupt the measurement. This leaves all participants in a non-ideal state, whereas cooperation would in fact improve the measurement.

The present invention gives an incentive for cooperation, without the threat posed by defecting participants. The declared random delays on the pulses and subtraction from the detections, together with varying pulse repetition rates allow the present invention not to be interfered, and not to interfere itself, by and with other TOF systems in a multi-user environment.

It should be noted that malicious systems such as proposed e.g. in WO2015128682 rely on the accurate determination of the targeted system's emission. They need to analyze in real time what average PRR the targeted system emits at, including the statistical distribution of the pulse delay spacing. The present invention avoids the interference of such intentional jammers by rendering it impractical to determine said required parameters in real time. Since the average PRR changes randomly, this change is likely to happen during the frequency analysis. The jamming device thus needs a significantly longer integration time to determine the right PRR; an asymptotically approaching algorithm wouldn't yield a good enough synchronism. The random delays leave open the possibility to skip a pulse, when the delay is as large as the inverse of the repetition rate. Such skipped pulses further impede determining the PRR.

In the above description it was assumed that the PRR applied is the same for all single acquisitions during one integration time. The primary task of the MCU is to set a PRR, wait for the duration of the integration time, read out the DPU, and transmit the read out distance values while requesting another PRR, and repeat.

In yet another embodiment the request for a new PRR happens asynchronously from waiting during the integration time, before reading out the DPU. As a result also the PRR can change during the integration time, either in predefined intervals, or again using an RNG element.

A jammer or spoofer, respectively, would hence have to emit at an impractical amount of different delays to ensure to cover all possible delays and PRR of the targeted system. Hence, the only option for such a malicious participant is to blind the other participants in the multi-user environment, but it cannot inject wrong distances.

The RNGs can either be, for example, a source of physical real random noise, or using linear-feedback shift registers. The choice of RNG (350, 251, 352)—whether for example to use real physical random noise, or a pseudo random scheme employing linear-feedback shift registers, or another implementation—depends on system level aspects evident for a person skilled in the art.

Figure 11:
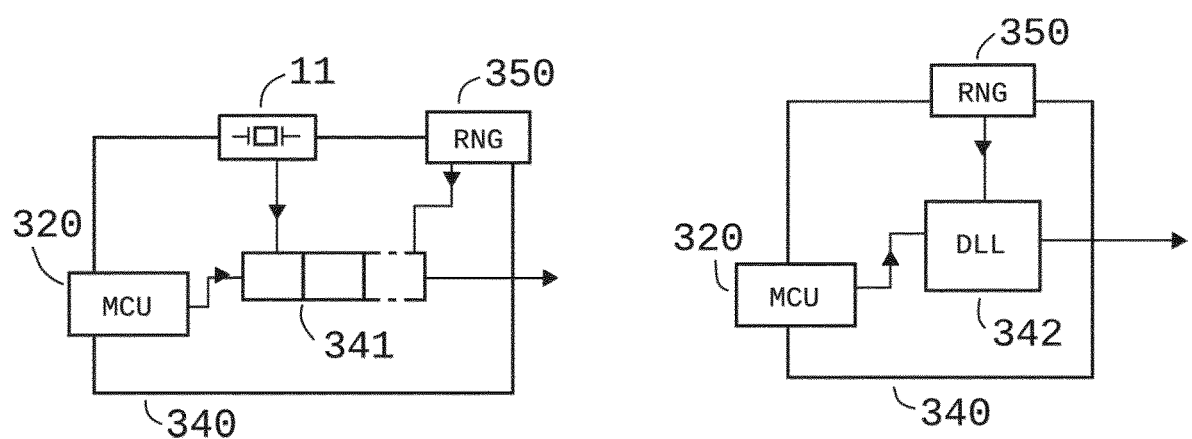
FIG. 11 is a schematic block diagram of the delay block of the logic circuit of the TOF system according to the invention illustrated in FIGS. 4, 8-10.

The delay block (340) can be implemented in various ways, some embodiments are illustrated in FIG. 11. For example the delays can be generated with the system clock (11) providing its base delay steps, and subsequently delaying the signal from the MCU (320) by a random amount of the clock cycles (11) in a delay chain (341). But clock independent delay embodiments can also be thought of, using for example a delay locked loop (DLL) (342). Such an independent delay generation provides additional protection over counter-measures such as described in WO2015128682, which need the targeted TOF system to emit on few discrete levels. Of course still other methods to create controlled delays are evident for a person skilled in the art.

It will be understood by those skilled in the art that the present invention is not limited to the embodiments illustrated above and that many modifications and additions may be made without departing from the scope of the invention as defined in the appending claims.

The invention claimed is:

1. A method for measuring a distance to a target in a multi-user environment comprising multiple time of flight (TOF) systems by means of at least one sensor, comprising:
    by an emission circuit, irradiating the environment by means of a series of radiation pulses, wherein the series of radiation pulses are emitted at a determined repetition rate and with an added random delay calculated by a logic circuit;
    by a detection circuit, collecting pulses that are reflected or scattered from the environment to at least one detector connected to at least one chronometer;
    by the detection circuit, assigning a timestamp at the detection of each of the collected pulses;
    by the logic circuit, subtracting the added random delay from the assigned timestamp coming from the chronometer to obtain the time of arrival (TOA) for each of the collected pulses;
    by a data processing unit (DPU), determining the statistical distribution of said time of arrivals; and
    by the DPU, determining the distance to the target from said statistical distribution.

2. The method according to claim 1 wherein the step of determining the distance from the statistical distribution of said TOAs consists in determining the TOA that appears most often in the distribution with respect to the randomly distributed noise contribution, said TOA corresponding to the time of flight (TOF).

3. The method according to claim 1 wherein the pulse repetition rate (PRR) is varied for every distance measurement.

4. The method according to claim 3 wherein each TOF system of said multiple TOF systems broadcasts via an independent channel a determined pulse repetition rate (PRR) to the other TOF systems.

5. The method according to claim 4 wherein each TOF system of said multiple TOF systems broadcasts via an independent channel at least two different determined pulse repetition rates (PRRs) to the other TOF systems.

6. A device for measuring a distance to a target in a multi-user environment comprising multiple time of flight (TOF) systems, the device comprising:
    at least an irradiation device of said environment providing at least a series of radiation pulses at a determined repetition rate and with an added random delay;
    at least one detector arranged to detect the reflected pulses from the environment from at least said emitted pulses and connected to at least one chronometer;
    at least means for assigning a timestamp at the detection of each of the collected pulses;
    a logic circuit for calculating the added random delay and subtracting the added random delay from the assigned timestamps coming from the chronometer to obtain the time of arrival (TOA) for each of the collected pulses; and
    a data processing unit (DPU) for determining the statistical distribution of said time of arrivals (TOAs) and determining the distance to the target from said statistical distribution.

7. The device according to claim 6 wherein the DPU is configured for determining the TOA that appears most often in the distribution with respect to the randomly distributed noise contribution, said TOA corresponding to the time of flight.

8. The device according to claim 6 further comprising a measurement control unit (MCU) for varying the pulse repetition rate (PRR) for every distance measurement.

9. The device according to claim 8 further comprising means for broadcasting via an independent channel a determined pulse repetition rate (PRR) to the TOF systems.

10. The device according to claim 9 further comprising means for broadcasting via an independent channel at least two different determined pulse repetition rates (PRRs) to the TOF systems.

* * * * *